US012134564B2

(12) United States Patent
Chomette et al.

(10) Patent No.: US 12,134,564 B2
(45) Date of Patent: Nov. 5, 2024

(54) PRECIPITATED SILICA AND PROCESS FOR ITS MANUFACTURE

(71) Applicant: RHODIA OPERATIONS, Aubervilliers (FR)

(72) Inventors: Cyril Chomette, Mérignac (FR); Frédéric Colbeau-Justin, Collonges au Mont d'Or (FR); Fabien Stocklouser, Francheville (FR); Cédric Boivin, Chasselay (FR); Thomas Chaussee, Cailloux-sur-Fontaines (FR)

(73) Assignee: RHODIA OPERATIONS, Lyons (FR)

( * ) Notice: Subject to any disclaimer, the term of this patent is extended or adjusted under 35 U.S.C. 154(b) by 732 days.

(21) Appl. No.: 17/291,030

(22) PCT Filed: Nov. 6, 2019

(86) PCT No.: PCT/EP2019/080397
§ 371 (c)(1),
(2) Date: May 4, 2021

(87) PCT Pub. No.: WO2020/094717
PCT Pub. Date: May 14, 2020

(65) Prior Publication Data
US 2021/0371289 A1 Dec. 2, 2021

(30) Foreign Application Priority Data
Nov. 8, 2018 (EP) .................... 18306462

(51) Int. Cl.
*C01B 33/193* (2006.01)
*B60C 1/00* (2006.01)
*C08K 3/36* (2006.01)
*C08L 101/00* (2006.01)
*B82Y 40/00* (2011.01)

(52) U.S. Cl.
CPC .............. *C01B 33/193* (2013.01); *B60C 1/00* (2013.01); *C08K 3/36* (2013.01); *C08L 101/00* (2013.01); *B82Y 40/00* (2013.01); *C01P 2004/64* (2013.01); *C01P 2006/12* (2013.01)

(58) Field of Classification Search
CPC ......... C01B 33/12; C01B 33/193; B60C 1/00; C08K 3/36; C08L 101/00; B82Y 40/00; B82Y 30/00; C01P 4/64; C01P 2006/12
See application file for complete search history.

(56) References Cited

U.S. PATENT DOCUMENTS

| 5,587,416 | A | * | 12/1996 | Chevallier | ................ | C09C 1/30 |
| | | | | | | 524/492 |
| 6,180,076 | B1 | | 1/2001 | Uhrlandt et al. | | |
| 6,800,267 | B2 | * | 10/2004 | Schubert | .............. | B41M 5/5218 |
| | | | | | | 106/482 |
| 9,550,682 | B2 | * | 1/2017 | Clouin | .................. | C01B 33/128 |
| 2002/0061404 | A1 | | 5/2002 | Schubert et al. | | |
| 2011/0263784 | A1 | | 10/2011 | Valero et al. | | |
| 2012/0077902 | A1 | * | 3/2012 | Steiner | ...................... | C08L 9/06 |
| | | | | | | 523/157 |
| 2015/0132577 | A1 | * | 5/2015 | Lahary | .................. | D21H 19/40 |
| | | | | | | 106/482 |
| 2015/0266742 | A1 | | 9/2015 | Clouin et al. | | |
| 2020/0079654 | A1 | * | 3/2020 | Allain Najman | ...... | B01J 35/613 |

FOREIGN PATENT DOCUMENTS

| CA | 2255456 A1 | 6/1996 |
| JP | 2017507888 A | 3/2017 |
| WO | 03016215 A1 | 2/2003 |
| WO | 2013092745 A1 | 6/2013 |
| WO | 2015121328 A1 | 8/2015 |

OTHER PUBLICATIONS

Standard NF ISO 5794-1, 2010, Appendix G Rubber compounding ingredients—Silica, precipitated, hydrated—Part 1: Non-rubber tests Page Count: 36.
Standard NF ISO 5794-1, Appendix E (Jun. 2010) Rubber compounding ingredients—Silica, precipitated, hydrated—Part 1: Non-rubber tests.
NF ISO289-2020 standard Rubber, unvulcanized Determinations using a shearing-disc viscometer.
NF ISO 37 standard (Nov. 2017) Rubber, vulcanized or thermoplastic—Determination of tensile stress-strain properties.
ASTM D 2240-15 standard Standard Test Method for Rubber Property-Durometer Hardness.
ASTM D5992-96 (reapproved 2018) Standard Guide for Dynamic Testing of Vulcanized Rubber and Rubber-Like Materials Using Vibratory Methods Page Count: 25.

* cited by examiner

*Primary Examiner* — Richard M Rump
(74) *Attorney, Agent, or Firm* — Osha Bergman Watanabe & Burton LLP

(57) ABSTRACT

A precipitated silica having large particle size for use in tire applications. In particular, a precipitated silica characterised by a CTAB surface area $S_{CTAB}$ equal to or greater than 160 m²/g; a median particle size d50, measured by centrifugal sedimentation, such that $$|d50| > 25000/|S_{CTAB}| \qquad (I)$$

wherein $|d50|$ represents the numerical value of the median particle size d50 measured by centrifugal sedimentation and expressed in nm and $|S_{CTAB}|$ represents the numerical value of the CTAB surface area $S_{CTAB}$ expressed in m²/g; and an aluminium content not exceeding 4500 ppm.

2 Claims, No Drawings

PRECIPITATED SILICA AND PROCESS FOR ITS MANUFACTURE

CROSS-REFERENCE TO RELATED APPLICATIONS

This application is a U.S. national stage entry under 35 U.S.C. § 371 of International Application No. PCT/EP2019/080397 filed Nov. 6, 2019, which claims priority to European patent application No. 18306462.5, filed on Nov. 8, 2018, the whole content of this application being incorporated herein by reference for all purposes.

TECHNICAL FIELD

The present invention relates to precipitated silica for use as reinforcing filler in elastomeric compositions.

BACKGROUND ART

The use of precipitated silica as a reinforcing filler in polymeric compositions, in particular in elastomeric compositions, is known. Such use is highly demanding: the filler has to readily and efficiently incorporate and disperse in the elastomeric matrix and, typically in conjunction with a coupling reagent, enter into a chemical bond with the elastomer(s), to lead to a high and homogeneous reinforcement of the elastomeric composition. Silica-filled elastomeric compositions find a particularly advantageous use in tire formulations. Tire treads filled with so-called highly dispersible silica have made it possible to achieve a compromise of properties, in terms of rolling resistance, wear resistance and grip, which cannot be obtained with a conventional carbon black for tires.

Precipitated silica having high surface area, typically in excess of 160 m$^2$/g are known. For instance WO 03/016215 A1 discloses precipitated silica having a high surface area and large particle size distribution.

WO 2013/092745 A1 discloses a process for the preparation of precipitated silica comprising the steps of: (i) providing an aqueous stock with a pH of between 2 and 5; (ii) simultaneously adding silicate and acid to said stock, such that the pH of the reaction medium is maintained between 2 and 5; (iii) stopping the addition of the acid, while continuing the addition of the silicate to the reaction medium until a pH value of the reaction medium of between 7 and 10 is obtained; (iv) simultaneously adding silicate and acid to the reaction medium, such that the pH of the reaction medium is maintained between 7 and 10; and (v) stopping the addition of the silicate while continuing the addition of the acid until a pH value of the reaction medium of less than 6 is obtained, in which process, a concentrated acid is used in at least part of step (ii). WO 2013/092745 A1 does not disclose the amount of silicate which is added to the reaction medium during step (ii) with respect to the total amount of silicate required for the reaction. The amount that can be calculated from the exemplified processes in WO 2013/092745 A1 is less than 50% of the total amount of silicate required for the reaction.

The advantage of using a high surface area silica resides mainly in the possibility of increasing the number of bonds of the silica with the elastomer and therefore of increasing the level of reinforcement. In tire tread rubber compositions it appears therefore advantageous to use silica having a high surface area at lower loading, in comparison to the loading which is conventionally used for silica having a surface area in the order of 160 m$^2$/g, in particular for improving the rolling resistance and wear resistance of the tire.

However, this achievement of improving tread wear properties using high surface area silica in the rubber composition may lead often to a decrease in wet grip performance. Indeed, the use of a large surface area silica having a small particle size supposes an increase in filler network, and as consequence, could generate lower hysteresis at low temperature and lower wet grip performance. There is therefore always a need for precipitated silica for use as reinforcing filler in polymeric compositions effective in compromising wet grip and rolling resistance performance without decreasing the benefit in tread wear performance.

SUMMARY OF INVENTION

It has now been found that precipitated silica having a specific relationship between surface area and particle size provide a good balance among the following properties of elastomeric compositions: high hysteresis at low temperature and low hysteresis at high temperature at comparable reinforcement index (tensile properties) and compound processability.

A first object of the present invention is a precipitated silica characterised by:
- a CTAB surface area $S_{CTAB}$ equal to or greater than 160 m$^2$/g;
- a median particle size d50, measured by centrifugal sedimentation, such that:

$$|d50|>25000/|S_{CTAB}| \qquad (I)$$

wherein:
|d50| represents the numerical value of the median particle size d50 measured by centrifugal sedimentation and expressed in nm and |$S_{CTAB}$| represents the numerical value of the CTAB surface area $S_{CTAB}$ expressed in m$^2$/g; and
an aluminium content not exceeding 4500 ppm.

In the remainder of the text the terms "silica" and "precipitated silica" may be used interchangeably to refer to precipitated silica. The term "particle" is used in the present specification to refer to aggregates of primary silica particles.

The CTAB surface area $S_{CTAB}$ is a measure of the external specific surface area as determined by measuring the quantity of N hexadecyl-N,N,N-trimethylammonium bromide adsorbed on the silica surface at a given pH.

The CTAB surface area $S_{CTAB}$ is preferably equal to or greater than 180 m$^2$/g. The CTAB surface area $S_{CTAB}$ may even be equal to or greater than 200 m$^2$/g.

The CTAB surface area does not exceed 400 m$^2$/g, typically it does not exceed 380 m$^2$/g. The CTAB surface area $S_{CTAB}$ may be lower than 350 m$^2$/g.

For elastomer reinforcement applications advantageous ranges of CTAB surface area $S_{CTAB}$ are: from 160 to 400 m$^2$/g, from 180 to 400 m$^2$/g, from 180 to 380 m$^2$/g, preferably from 180 to 350 m$^2$/g, from 200 to 350 m$^2$/g, even from 220 to 330 m$^2$/g.

An important feature of the inventive silica is the large median particle size (particle diameter) d50 for a given $S_{CTAB}$ value. In particular, it has been found that the median particle size of the inventive silica, at a given CTAB surface area $S_{CTAB}$, is higher than the value measured on precipitated silicas of the prior art.

The expression The term "particle" is used herein to refer to aggregates of primary silica particles. The term particle is used to refer to the smallest aggregate of primary silica particles that can be broken by mechanical action. In other words, the term particle refers to an assembly of indivisible primary particles.

It has been found that the median particle size d50 and the CTAB surface area $S_{CTAB}$ of the inventive silica are such that:

$$|d50|>25000/|S_{CTAB}| \quad (I).$$

In equation (I), $|S_{CTAB}|$ represents the numerical value of the CTAB surface area $S_{CTAB}$ expressed in m²/g. $|S_{CTAB}|$ is an adimensional number. As an example if the measured value of $S_{CTAB}$ is 200 m²/g, $|S_{CTAB}|$ is 200.

In equation (I), $|d50|$ represents the numerical value of the median particle size d50 measured by centrifugal sedimentation and expressed in nm. As an example if the value of d50 measured by centrifugal sedimentation is 100 nm, $|d50|$ is 100. d50 represents the diameter below (and above) which 50% of the total mass of aggregates is found. Thus, d50 represents the median particle size of a given distribution, wherein the term "size" in this context has to be intended as "diameter". $|d50|$ is an adimensional number.

In the CTAB surface area $S_{CTAB}$ range from 200 to 400 m²/g, the inventive silica is characterised by a median particle size d50 which is generally greater than 60 nm, even greater than 80 nm. In some instances the d50 in said CTAB surface area range may be greater than 90 nm.

The d50 value of the inventive silica typically does not exceed 250 nm, more typically it does not exceed 200 nm.

The inventive silica is generally characterised by aggregates of primary particles having on average the same size, i.e. one single median as measured by example by electron microscopy (TEM) or small-angle-X-Ray scattering (SAXS), rather than aggregates of primary particles having more than one distinct primary particle size on average. That is, the precipitated silica of the invention is characterised by one population of primary particle sizes.

The precipitated silica of the invention is further characterised by a broad particle size distribution. Parameter Ld, determined by means of centrifugal sedimentation in a disc centrifuge as detailed hereafter, is used to characterize the width of the particle size distribution. Ld is defined as follows:

$$Ld=(d84-d16)/d50$$

wherein dn is the diameter below which n % of the total measured mass is found. Ld is an adimensional number. The width of the particle size distribution Ld is calculated on the cumulative particle size curve.

The width of the particle size distribution Ld is at least 1.2, typically at least 1.3, preferably at least 1.4. The width of the particle size distribution Ld is no more than 4.0, typically no more than 3.5.

Advantageously, the width of the particle size distribution Ld of the inventive silica is in the range from 1.2 to 3.5, even in the range from 1.3 to 3.2. The width of the particle size distribution Ld of the inventive silica can be in the range from 1.3 to 3.0, preferably from 1.4 to 3.0, more preferably from 1.5 to 2.8.

The precipitated silica of the invention contains less than 4500 ppm of aluminium, typically less than 4000 ppm. The amount of aluminium is defined as the amount by weight of aluminium metal with respect to the weight of silica. The content of aluminium in the inventive silica generally does not exceed 3800 ppm, preferably it does not exceed 3500 ppm. The content of aluminium may be as low as 100 ppm.

The inventive precipitated silica is typically characterized by a large pore volume distribution as defined in terms of the ratio $V_{(d5-d50)}/V_{(d5-d100)}$, wherein $V_{(d5-d50)}$ represents the pore volume formed by the pores of diameters between d5 and d50 and $V_{(d5-d100)}$ represents the pore volume formed by the pores of diameters between d5 and d100, dn here being the pore diameter for which n % of the total surface area of all the pores is formed by the pores of diameter greater than that diameter.

The inventive silica typically has a ratio $V_{(d5-d50)}/V_{(d5-d100)}$ equal to or greater than 0.60, preferably equal to or greater than 0.65, even equal to or greater than 0.70. The ratio $V_{(d5-d50)}/V_{(d5-d100)}$ typically does not exceed 1.20.

BET surface area $S_{BET}$ of the inventive silica is not particularly limited. BET surface area $S_{BET}$ is generally at least 160 m²/g, at least 170 m²/g. The BET surface area $S_{BET}$ can be as high as 400 m²/g, even as high as 450 m²/g.

The precipitated silica of the invention is typically characterised by a difference $(S_{BET}-S_{CTAB})$ of at least 30 m²/g. Values of the difference $(S_{BET}-S_{CTAB})$ are not limited. In general the difference $(S_{BET}-S_{CTAB})$ is less than 100 m₂/g.

The inventive silica is characterised by a number of silanols SiOH per nm², $N_{SiOH/nm2}$, of at least 4.0, even of at least 4.5 $N_{SiOH/nm2}$.

A second object of the present invention is a process for preparing the precipitated silica of the first object, said process comprising:
 (i) providing a starting solution having a pH from 2.0 to 5.0,
 (ii) simultaneously adding a silicate and an acid to said starting solution such that the pH of the reaction medium is maintained in the range from 2.0 to 5.0,
 (iii) stopping the addition of the acid and of the silicate and adding a base to the reaction medium to raise the pH of said reaction medium to a value from 7.0 to 10.0,
 (iv) simultaneously adding to the reaction medium a silicate and an acid, such that the pH of the reaction medium is maintained in the range from 7.0 to 10.0,
 (v) stopping the addition of the silicate while continuing the addition of the acid to the reaction medium to reach a pH of the reaction medium of less than 5.5 and obtaining a suspension of precipitated silica,
 wherein the amount of silicate added to the reaction medium during step (ii) is more than 55% by weight of the total amount of silicate required for the reaction.

The total amount of silicate to obtain a given final amount of silica can be determined by the person skilled in the art at the beginning of the process according to common general knowledge.

The term "base" is used herein to refer to one or more than one base which can be added during the course of the inventive process and it includes the group consisting of silicates as defined hereafter. Any base may be used in the process. In addition to silicates, notable non-limiting examples of suitable bases are for instance alkali metal hydroxides and ammonia.

The term "silicate" is used herein to refer to one or more than one silicate which can be added during the course of the inventive process. The silicate is typically selected from the group consisting of the alkali metal silicates. The silicate is advantageously selected from the group consisting of sodium and potassium silicate. The silicate may be in any known form, such as metasilicate or disilicate.

In the case where sodium silicate is used, the latter generally has an $SiO_2/Na_2O$ weight ratio of from 2.0 to 4.0, in particular from 2.4 to 3.9, for example from 3.1 to 3.8.

The silicate may have a concentration (expressed in terms of $SiO_2$) of from 3.9 wt % to 25.0 wt %, for example from 5.6 wt % to 23.0 wt %, in particular from 5.6 wt % to 20.7 wt %.

The term "acid" is used herein to refer to one or more than one acid which can be added during the course of the inventive process. Any acid may be used in the process. Use is generally made of a mineral acid, such as sulfuric acid, nitric acid, phosphoric acid or hydrochloric acid, or of an organic acid, such as carboxylic acids, e.g. acetic acid, formic acid or carbonic acid.

The acid may be metered into the reaction medium in diluted or concentrated form. The same acid at different concentrations may be used in different stages of the process. Preferably the acid is sulfuric acid.

In a preferred embodiment of the process sulfuric acid and sodium silicate are used in all of the stages of the process. Preferably, the same sodium silicate, that is sodium silicate having the same concentration expressed as $SiO_2$, is used in all of the stages of the process.

In step (i) of the process a starting solution having a pH from 2.0 to 5.0 is provided in the reaction vessel. The starting solution is an aqueous solution, the term "aqueous" indicating that the solvent is water.

Preferably, the starting solution has a pH from 2.5 to 5.0, especially from 2.8 to 4.4; for example, from 3.0 to 4.0.

The starting solution may be obtained by adding an acid to water so as to obtain a pH value as detailed above.

Alternatively, the starting solution may contain a silicate. In such a case it may be obtained by adding acid to a mixture of water and silicate to obtain a pH from 2.0 to 5.0.

The starting solution of step (i) may or may not comprise an electrolyte. Preferably, the starting solution of step (i) contains an electrolyte.

The term "electrolyte" is used herein in its generally accepted meaning, i.e. to identify any ionic or molecular substance which, when in solution, decomposes or dissociates to form ions or charged particles. The term "electrolyte" is used herein to indicate one or more than one electrolyte may be present. Mention may be made of electrolytes such as the salts of alkali metals and alkaline-earth metals. Advantageously, the electrolyte for use in the starting solution is the salt of the metal of the starting silicate and of the acid used in the process. Notable examples are for example sodium chloride, in the case of the reaction of a sodium silicate with hydrochloric acid or, preferably, sodium sulfate, in the case of the reaction of a sodium silicate with sulfuric acid. The electrolyte does not contain aluminium.

Preferably, when sodium sulfate is used as electrolyte in step (i), its concentration in the starting solution is from 8 to 40 g/L, especially from 10 to 35 g/L, for example from 10 to 30 g/L.

Step (ii) of the process comprises a simultaneous addition of an acid and of a silicate to the starting solution. The rates of addition of the acid and of the silicate during step (ii) are controlled in such a way that the pH of the reaction medium is maintained in the range from 2.0 to 5.0. The pH of the reaction medium is preferably maintained in the range from 2.5 to 5.0, especially from 2.8 to 5.0, for example from 2.8 to 4.5.

The inventive process is characterised by the fact that the amount of silicate added during step (ii) is at least 55%, preferably at least 65% of the total amount of silicate required for the reaction.

Without being bound by theory, it is believed that the addition to the reaction mixture of at least 55% of the total required amount of silicate during step (ii) has the effect of increasing the median particle size d50 of the silica aggregates.

Preferably, step (ii) consists of a simultaneous addition of acid and silicate as detailed above.

In one embodiment of the inventive process, an intermediate step (ii') may be carried out between step (i) and step (ii), wherein a silicate and an acid are added to the starting solution such that the pH of the reaction medium is maintained in the range from 2.0 to 9.5. The addition of silicate and acid can be simultaneous for all or for only a part of step (ii'). Step (ii') is typically protracted for 1 to 10 minutes, preferable for 2 to 8 minutes before step (ii) is initiated.

Next, in step (iii), the addition of the acid and of the silicate is stopped and a base is added to the reaction medium. The addition of the base is stopped when the pH of the reaction medium has reached a value of from 7.0 to 10.0, preferably from 7.5 to 9.5.

In a first embodiment of the process the base is a silicate. Thus, in step (iii), the addition of the acid is stopped while the addition of the silicate to the reaction medium is continued until a pH of from 7.0 to 10.0, preferably from 7.5 to 9.5, is reached.

In a second embodiment of the process the base is different from a silicate and it is selected from the group consisting of the alkali metal hydroxides, preferably sodium or potassium hydroxide. When sodium silicate is used in the process a preferred base may be sodium hydroxide.

Thus, in this second embodiment of the process, in step (iii), the addition of the acid and of the silicate is stopped and a base, different from a silicate, is added to the reaction medium until a pH of from 7.0 to 10.0, preferably from 7.5 to 9.5, is reached.

At the end of step (iii), that is after stopping the addition of the base, it may be advantageous to perform a maturing step of the reaction medium. This step is preferably carried out at the pH obtained at the end of step (iii). The maturing step may be carried out while stirring the reaction medium. The maturing step is preferably carried out under stirring of the reaction medium over a period of 2 to 45 minutes, in particular from 5 to 25 minutes. Preferably the maturing step does not comprise any addition of acid or silicate.

After step (iii) and the optional maturing step, a simultaneous addition of an acid and of a silicate is performed, such that the pH of the reaction medium is maintained in the range from 7.0 to 10.0, preferably from 7.5 to 9.5.

The simultaneous addition of an acid and of a silicate (step (iv)) is typically performed in such a manner that the pH value of the reaction medium is maintained equal to the pH reached at the end of the preceding step (to within ±0.2 pH units), step (iii).

It should be noted that the inventive process may comprise additional steps. For example, between step (iii) and step (iv), and in particular between the optional maturing step following step (iii) and step (iv), an acid can be added to the reaction medium. The pH of the reaction medium after this addition of acid should remain in the range from 7.0 to 9.5, preferably from 7.5 to 9.5.

In step (v), the addition of the silicate is stopped while continuing the addition of the acid to the reaction medium so as to obtain a pH value in the reaction medium of less than 5.5, preferably from 3.0 to 5.5, in particular from 3.0 to 5.0. A suspension of precipitated silica is obtained in the reaction vessel.

At the end of step (v), and thus after stopping the addition of the acid to the reaction medium, a maturing step may advantageously be carried out. This maturing step may be carried out at the same pH obtained at the end of step (v) and under the same time conditions as those described above for the maturing step which may be optionally carried out between step (iii) and (iv) of the process.

The total amount of silicate required for the reaction includes the silicate which may be present in the starting solution (step (i)), the silicate added to the reaction medium during steps (ii), step (ii'), when present, step (iv) and during step (iii) when the base used for raising the pH in this step is a silicate.

The reaction vessel in which the entire reaction of the silicate with the acid is performed is usually equipped with adequate stirring and heating equipment.

The entire reaction of the silicate with the acid (steps (i) to (v)) is generally performed at a temperature from 40 to 97° C., in particular from 60 to 95° C., preferably from 80 to 95° C., more preferably from 85 to 95° C.

According to one variant of the invention, the entire reaction of the silicate with the acid is performed at a constant temperature, usually of from 40 to 97° C., in particular from 80 to 95° C., and even from 85 to 95° C.

According to another variant of the invention, the temperature at the end of the reaction is higher than the temperature at the start of the reaction: thus, the temperature at the start of the reaction (for example during steps (i) to (iii)) is preferably maintained in the range from 40 to 85° C. and the temperature is then increased, preferably up to a value in the range from 80 to 95° C., even from 85 to 95° C., at which value it is maintained (for example during steps (iv) and (v)), up to the end of the reaction.

At the end of the steps that have just been described, a suspension of precipitated silica is obtained, which is subsequently separated (liquid/solid separation). The process typically comprises a further step (vi) of filtering the suspension and drying the precipitated silica.

The separation performed in the preparation process according to the invention usually comprises a filtration, followed by washing, if necessary. The filtration is performed according to any suitable method, for example by means of a belt filter, a rotary filter, for example a vacuum filter, or, preferably a filter press.

The filter cake is then subjected to a liquefaction operation during which a mineral acid is added to the filter cake. The acid is selected among the group consisting of sulfuric acid, hydrochloric acid, phosphoric acid, nitric acid. The acid is preferably sulfuric acid. The amount of the mineral acid added to the filter cake during the liquefaction step is such that the pH of the final product precipitated silica is less than 5.5, preferably less than 4.5. The pH may be even less than 3.5, although it is generally not lower than 3.0.

The term "liquefaction" is intended herein to indicate a process wherein a solid, namely the filter cake, is converted into a fluid-like mass. After the liquefaction step the filter cake is in a flowable, fluid-like form and the precipitated silica is in suspension.

The liquefaction step may comprise a mechanical treatment which results in a reduction of the granulometry of the silica in suspension. Said mechanical treatment may be carried out by passing the filter cake through a high shear mixer, a colloidal-type mill or a ball mill.

During the liquefaction step an aluminium compound may be added to the filter cake, with the proviso that the pH of the final product precipitated silica is less than 8.0, preferably less than 7.0 and that the total amount of aluminium in the precipitated silica does not exceed 4500 ppm.

The suspension of precipitated silica which is obtained after the liquefaction step is subsequently preferably dried.

Drying may be performed according to means known in the art. Preferably, the drying is performed by atomization. To this end, use may be made of any type of suitable atomizer, in particular a turbine, nozzle, liquid pressure or two-fluid spray-dryer. In general, when the filtration is performed using a filter press, a nozzle spray-dryer is used, and when the filtration is performed using a vacuum filter, a turbine spray-dryer is used.

When the drying operation is performed using a nozzle spray-dryer, the precipitated silica that may then be obtained is usually in the form of substantially spherical beads. After this drying operation, it is optionally possible to perform a step of milling or micronizing on the recovered product; the precipitated silica that may then be obtained is generally in the form of a powder.

When the drying operation is performed using a turbine spray-dryer, the precipitated silica that may then be obtained may be in the form of a powder.

Finally, the dried, milled or micronized product as indicated previously may optionally be subjected to an agglomeration step, which consists, for example, of direct compression, wet granulation (i.e. with use of a binder, such as water, silica suspension, etc.), extrusion or, preferably, dry compacting.

The precipitated silica that may then be obtained via this agglomeration step is generally in the form of granules.

The precipitated silica according to the present invention or obtained by the process described above according to the invention can be used in numerous applications.

The inventive precipitated silica can be employed, for example, as catalyst support. It may be used as absorbent for active materials, such as liquids, especially used in food, such as vitamins (vitamin E) or choline chloride. It can be used as viscosifying, texturizing or anticaking agent, as battery separator component, or as additive for toothpaste, concrete, or paper.

However, the inventive precipitated silica finds a particularly advantageous application in the reinforcement of natural or synthetic polymers and polymer blends of thereof.

Elastomeric compositions containing the inventive silica were found to have an excellent potential in tire tread compositions containing in particular in improving substantially rolling resistance and wet grip performances while keeping high level of tire handling and wear performances with respect to compositions comprising precipitated silica of the prior art.

Accordingly, a further object of the invention is a composition comprising the inventive silica as above defined and at least one polymer. The phrase "at least one" when referred to the polymer in the composition is used herein to indicate that one or more than one polymer of each type can be present in the composition.

The expression "copolymer" and "terpolymer" is used herein to refer to polymers comprising recurring units deriving from respectively two and three monomeric units of different nature.

The at least one polymer can be selected among the thermosetting polymers and the thermoplastic polymers. Notable, non-limiting examples of thermosetting polymers include thermosetting resins such as epoxy resins, unsaturated polyester resins, vinyl ester resins, phenolic resins, epoxy acrylate resins, urethane acrylate resins, phenoxy resins, alkyd resins, urethane resins, maleimide resins, and cyanate resins.

Notable, non-limiting examples of suitable thermoplastic polymers include styrene-based polymers such as polystyrene, (meth)acrylic acid ester/styrene copolymers, acrylonitrile/styrene copolymers, styrene/maleic anhydride copolymers, ABS; acrylic polymers such as polymethylmethacrylate; polycarbonates; polyamides; polyesters, such as polyethylene terephthalate and polybutylene terephthalate; polyphenylene ethers; polysulfones; polyaryletherketones; polyphenylene sulfides; thermoplastic polyurethanes; polyolefins such as polyethylene, polypropylene, polybutene, poly-4-methylpentene, ethylene/propylene copolymers, ethylene/α-olefins copolymers; copolymers of α-olefins and various monomers, such as ethylene/vinyl acetate copolymers, ethylene/(meth)acrylic acid ester copolymers, ethylene/maleic anhydride copolymers, ethylene/acrylic acid copolymers; aliphatic polyesters such as polylactic acid, polycaprolactone, and aliphatic glycol/aliphatic dicarboxylic acid copolymers.

The inventive silica may advantageously be employed as reinforcing filler in elastomeric compositions. Accordingly a preferred object of the invention is a composition comprising the inventive silica and one or more elastomers, preferably exhibiting at least one glass transition temperature between −150° C. and +300° C., for example between −150° C. and +20° C.

Notable non-limiting examples of suitable elastomers are diene elastomers. For example, use may be made of elastomers deriving from aliphatic or aromatic monomers, comprising at least one unsaturation such as, in particular, ethylene, propylene, butadiene, isoprene, styrene, acrylonitrile, isobutylene or vinyl acetate, polybutyl acrylate, or their mixtures. Mention may also be made of functionalized elastomers, that is elastomers functionalized by chemical groups positioned along the macromolecular chain and/or at one or more of its ends (for example by functional groups capable of chemically reacting or not with the surface of the silica), and halogenated polymers. Mention may be made of polyamides, ethylene homo- and copolymer, propylene homo- and copolymer.

Among diene elastomers mention may be made, for example, of polybutadienes (BRs), polyisoprenes (IRs), butadiene copolymers, isoprene copolymers, or their mixtures, and in particular styrene/butadiene copolymers (SBRs, in particular ESBRs (emulsion) or SSBRs (solution)), isoprene/butadiene copolymers (BIRs), isoprene/styrene copolymers (SIRs), isoprene/butadiene/styrene copolymers (SBIRs), ethylene/propylene/diene terpolymers (EPDMs), acrylonitrile based copolymers or terpolymers and also the associated functionalized polymers (exhibiting, for example, pendant polar groups or polar groups at the chain end, which can interact with the silica).

Mention may also be made of natural rubber (NR) and epoxidized natural rubber (ENR).

The polymer compositions can be vulcanized with sulfur or crosslinked, in particular with peroxides or other crosslinking systems (for example diamines or phenolic resins).

In general, the polymer compositions additionally comprise at least one coupling agent and/or at least one covering agent; they can also comprise, inter alia, an antioxidant.

Use may in particular be made, as coupling agents, as nonlimiting examples, of "symmetrical" or "unsymmetrical" silane polysulfides; mention may more particularly be made of bis((C1-C4)alkoxyl(C1-C4)alkylsilyl(C1-C4)alkyl) polysulfides (in particular disulfides, trisulfides or tetrasulfides), such as, for example, bis(3-(trimethoxysilyl)propyl) polysulfides or bis(3-(triethoxysilyl)propyl) polysulfides, such as triethoxysilylpropyl tetrasulfide. Mention may also be made of monoethoxydimethylsilylpropyl tetrasulfide. Mention may also be made of silanes comprising masked or free thiol functional groups.

The coupling agent can be grafted beforehand to the polymer. It can also be employed in the free state or grafted at the surface of the silica. The coupling agent can optionally be combined with an appropriate "coupling activator", that is to say a compound which, mixed with this coupling agent, increases the effectiveness of the latter.

The proportion by weight of the inventive silica in the polymer composition can vary within a fairly wide range. It normally represents from 10% to 200% by weight, in particular from 20% to 150% by weight, especially from 20% to 80% by weight, for example from 30% to 70% by weight. Alternatively proportion by weight of the inventive silica in the polymer composition can be from 40% to 120% by weight, for example from 60% to 110% by weight, of the amount of the polymer(s).

The silica according to the invention can advantageously constitute all of the reinforcing inorganic filler and even all of the reinforcing filler of the polymer composition.

The silica according to the invention can optionally be combined with at least one other reinforcing filler, such as, in particular, a commercial highly dispersible silica, such as, for example, Zeosil® 1165 MP, Zeosil® 1115 MP or Zeosil® 1085 MP (commercially available from Solvay); another reinforcing inorganic filler, such as, for example, alumina, indeed even a reinforcing organic filler, in particular carbon black (optionally covered with an inorganic layer, for example of silica). The silica according to the invention then preferably constitutes at least 50% by weight, indeed even at least 80% by weight, of the total amount of the reinforcing filler.

The compositions comprising the precipitated silica of the invention may be used in the manufacture of a number of articles. Non-limiting examples of articles comprising the inventive silica or the polymer composition described above, are for instance footwear soles, floor coverings, gas barriers, flame-retardant materials and also engineering components, such as rollers for cableways, seals for domestic electrical appliances, seals for liquid or gas pipes, braking system seals, pipes, sheathings, in particular cable sheathings, cables, engine supports, battery separators, conveyor belts, transmission belts or, dampers. Advantageously, the inventive silica may be used in the manufacture of tires, in particular tire treads, especially for light vehicles or for heavy-load vehicles.

Should the disclosure of any patents, patent applications, and publications which are incorporated herein by reference conflict with the description of the present application to the extent that it may render a term unclear, the present description shall take precedence.

The invention will be now described in more detail with reference to the following examples whose purpose is merely illustrative and not limitative of the scope of the invention.

Analytical Methods

The physicochemical properties of the precipitated silica of the invention were determined using the methods described hereafter.

Determination of CTAB Surface Area

CTAB surface area ($S_{CTAB}$) values were determined according to an internal method derived from standard NF ISO 5794-1, Appendix G.

Determination of BET Surface Area

BET surface area $S_{BET}$ was determined according to the Brunauer-Emmett-Teller method as detailed in standard NF ISO 5794-1, Appendix E (June 2010) with the following adjustments: the sample was pre-dried at 200° C.±10° C.; the partial pressure used for the measurement P/P° was between 0.05 and 0.3.

Determination of the Particle Size Distribution and Particle Size by Centrifugal Sedimentation in a Disc Centrifuge (CPS)

Values of d50, d16, d84 and Ld were determined centrifugal sedimentation in a disc centrifuge using a centrifugal photosedimentometer type "CPS DC 24000UHR", marketed by CPS Instruments company. This instrument is equipped with operating software supplied with the device (operating software version 11g).

Instruments used: for the measurement requirement, the following materials and products were used: Utrasound system: 1500 W generator type Sonics Vibracell VC1500/VCX1500 equipped with 19 mm probe (Converters: CV154+ Boosters (Part No: BHNVC21)+19 mm Probe (Part No: 630-0208)).

Analytical balance with a precision of 0.1 mg (e.g. Mettler AE260); Syringes: 1.0 ml and 2.0 ml with 20 ga needles; high shape glass beaker of 50 mL (SCHOTT DURAN: 38 mm diameter, 78 mm high); magnetic stirrer with a stir bar of 2 cm; vessel for ice bath during sonication.

Chemicals: deionized water; ethanol 96%; sucrose 99%; dodecane, all from Merck; PVC reference standard from CPS Instrument Inc.; the peak maximum of the reference standard used should be between 200 and 600 nm (e.g. 237 nm).

Preparation of the Disc Centrifuge

For the measurements, the following parameters were established. For the calibration standard parameters, the information of the PVC reference communicated by the supplier were used.

| Sample Parameters | | |
|---|---|---|
| max.diameter | μm | 0.79 |
| min.diameter | μm | 0.02 |
| particle density | g/mL | 2.11 |
| particle refrative index | | 1.46 |
| particle absorption | K | 0.001 |
| non-sphericity factor | | 1 |
| Calibration Standard Parameters | | |
| peak diameter | nm | 237 |
| half height peak width | μm | 0.023 |
| particle density | | 1.385 |
| Fluid Parameters | | |
| fluid density | g/mL | 1.051 |
| fluid Refractive Index | | 1.3612 |
| fluid viscosity | cps<sup>×</sup> | 1.28 |

<sup>×</sup>cps = centipoise

System Configuration

The measurement wavelength was set to 405 nm. The following runtime options parameters were established:

| | |
|---|---|
| Force Baseline: | Yes |
| Correct for Non-Stokes: | No |
| Extra Software Noise Filtration: | No |
| Baseline Drift Display: | Show |
| Calibration method: | External |
| Samples per calibration: | 1 |

All the others options of the software are left as set by the manufacturer of the instrument.

Preparation of the Disc Centrifuge

The centrifugal disc is rotated at 24000 rpm during 30 min. The density gradient of sucrose (CAS n° 57-50-1) is prepared as follows:

In a 50 mL beaker, a 24% in weight aqueous solution of sucrose is prepared. In a 50 mL beaker, a 8% in weight aqueous solution of sucrose is prepared. Once these two solutions are homogenized separately, samples are taken from each solution using a 2 mL syringe which is injected into the rotating disc in the following order:

Sample 1: 1.8 mL of the 24 wt % solution
Sample 2: 1.6 mL of the 24 wt % solution+0.2 mL of the 8 wt % solution
Sample 3: 1.4 mL of the 24 wt % solution+0.4 mL of the 8 wt % solution
Sample 4: 1.2 mL of the 24 wt % solution+0.6 mL of the 8 wt % solution
Sample 5: 1.0 mL of the 24 wt % solution+0.8 mL of the 8 wt % solution
Sample 6: 0.8 mL of the 24 wt % solution+1.0 mL of the 8 wt % solution
Sample 7: 0.6 mL of the 24 wt % solution+1.2 mL of the 8 wt % solution
Sample 8: 0.4 mL of the 24 wt % solution+1.4 mL of the 8 wt % solution
Sample 9: 0.2 mL of the 24 wt % solution+1.6 mL of the 8 wt % solution
Sample 10: 1.8 mL of the 8 wt % solution Before each injection into the disk, the two solutions are homogenized in the syringe by aspiring about 0.2 mL of air followed by brief manual agitation for a few seconds, making sure not to lose any liquid.

These injections, the total volume of which is 18 mL, aim to create a density gradient useful for eliminating certain instabilities which may appear during the injection of the sample to be measured. To protect the density gradient from evaporation, we add 1 mL of dodecane in the rotating disc using a 2 mL syringe. The disc is then left in rotation at 24000 rpm for 60 min before any first measurement.

Sample Preparation 3.2 g of silica in a 50 mL high shape glass beaker (SCHOTT DURAN: diameter 38 mm, height 78 mm) were weighed and 40 mL of deionized water were added to obtain a 8 wt % suspension of silica. The suspension was stirred with a magnetic stirrer (minimum 20 s) before placing the beaker into a crystallizing dish filled with ice and cold water. The magnetic stirrer was removed and the crystallizing dish was placed under the ultrasonic probe placed at 1 cm from the bottom of the beaker. The ultrasonic probe was set to 56% of its maximum amplitude and was activated for 8 min. At the end of the sonication the beaker was placed again on the magnetic stirrer with a 2 cm magnetic stir bar stirring at minimum 500 rpm until after the sampling.

The ultrasonic probe should be in proper working conditions. The following checks have to be carried out and incase of negative results a new probe should be used: visual check of the physical integrity of the end of the probe (depth of roughness less than 2 mm measured with a fine caliper); the measured d50 of commercial silica Zeosil® 1165MP should be 93 nm±3 nm.

Analysis

Before each samples was analysed, a calibration standard was recorded. In each case 0.1 mL of the PVC standard provided by CPS Instruments and whose characteristics were previously entered into the software was injected. It is important to start the measurement in the software simultaneously with this first injection of the PVC standard. The confirmation of the device has to be received before injecting 100 μL of the previously sonicated sample by making sure that the measurement is started simultaneously at the injection.

These injections were done with 2 clean syringes of 1 mL.

At the end of the measurement, which is reached at the end of the time necessary to sediment all the particles of smaller diameter (configured in the software at 0.02 μm), the ratio for each diameter class was obtained. The curve obtained is called aggregate size distribution.

Results: The values d50, d16, d84 and Ld are on the basis of distributions drawn in a linear scale. The integration of the particle size distribution function of the diameter allows obtaining a "cumulative" distribution, that is to say the total mass of particles between the minimum diameter and the diameter of interest.

d50: is the diameter below and above which 50% of the population by mass is found. The d50 is called median size, that is diameter, of the silica aggregate.

d84: is the diameter below which 84% of the total mass of aggregates is measured.

d16: is the diameter below which 16% of the total mass of aggregates is measured.

Ld: is calculated according to equation: Ld=(d84−d16)/d50

Determination of Pore Volume and Size of Pores by Mercury Porosimetry

Pore volume and pore size distribution were determined using a Micromeritics AutoPore® IV 9520 porosimeter; they were calculated by the Washburn relationship with a contact angle theta equal to 140° and a surface tension gamma equal to 485 dynes/cm. Each sample was dried before the measure in an oven at 200° C. for 2 hours at atmospheric pressure. The starting weight of silica placed in the type 10 Penetrometer, having an accuracy of 0.001 g, was selected for good reproducibility of the measurement, in such a way that the "stem volume used", i.e. the percentage mercury (Hg) volume consumed for filling of the penetrometer was from 40% to 80%. The penetrometer was then slowly evacuated to 50 μm of Hg and kept at this pressure for 5 min.

The AutoPore® equipment was operated using Software Version IV 1.09. No corrections were performed on the raw data. The measurement range was from 3.59 kPa (0.52 psi) to 413685 kPa (60000 psi), and at least 100 measurement points were used (19 measurement points from 3.59 kPa (0.52 psi) to 193 kPa (28 psi) with 10 seconds of equilibrium time and then 81 points from 1.93 kPa (0.28 psi) to 413685 kPa (60000 psi) with a 20 seconds equilibrium time). If appropriate, the software introduced further measurement points if the incremental intrusion volume was >0.5 mL/g. The intrusion curve was smoothed by means of the "smooth differentials" function of the equipment software.

The Log Differential Intrusion (mL/g) versus pore size data was analysed in the pore diameter range from 3.5 nm to 5 μm.

Determination of Content of Aluminium

The amount of aluminum was measured using XRF wavelength dispersive X-ray fluorescence spectrometry (using a WDXRF Panalytical instrument). Sample analyses were performed under helium in a 4 cm diameter cell using silica powder contained in the cell covered by a thin Prolene film (4 μm Chemplex®). Al and Si fluorescence were measured using the following parameters: Al Kα angle 2θ=144,9468° (20 s), background signal angle 2θ=−1,2030° (4 s), Si Kα angle 2θ=109,1152° (10 s), tube power 4 kW (32 kV, 125 mA), PE002 crystal and 550 μm collimator, gas flux detector.

Determination of Number of Silanols Per $Nm^2$

The number of silanols per $nm^2$ of surface area is determined by grafting methanol onto the surface of the silica. Firstly, 1 gram of silica was suspended in 10 mL of methanol, in a stirred autoclave. The autoclave, hermetically sealed and thermally insulated, was heated to 200° C. (40 bar) for 4 hours. The autoclave was then cooled in a cold water bath. The grafted silica was recovered by settling and the residual methanol evaporated in a stream of nitrogen. The grafted silica was vacuum dried for 12 hours at 130° C. The carbon content was determined by an elemental analysis. The number of silanols per $nm^2$ is calculated using the following formula:

$$N_{SiOH/nm2}=[(\% \text{ Cg}-\% \text{ Cr})\times 6.023\times 10^{23}]/[S_{BET}\times 10^{18}\times 12\times 100]$$

where % Cg: percent mass of carbon present on the grafted silica; and % Cr: percent mass of carbon present on the raw silica.

EXAMPLES

Example 1

928 liters of industrial water were introduced into a 2500 liter reactor and heated to 90° C. 14.7 kg of solid sodium sulfate were introduced into the reactor under stirring and sulfuric acid (concentration: 96 wt %) was then added until the pH reached the value of 4.2.

A sodium silicate solution ($SiO_2/Na_2O$ weight ratio: 3.43, density: 1.230 kg/L) was introduced into the reactor over a period of 50 minutes, at a flow rate of 352 L/h, simultaneously with sulfuric acid (concentration: 7.7 wt %). The flow rate of the acid was regulated so as to maintain the pH of the reaction medium at a value of 4.2. The amount of silicate added to the reaction medium was 79% of the total amount.

After 50 minutes the introduction of acid was stopped and the addition of silicate was continued to reach a pH value of 8.0. Meanwhile the temperature was increased to 94° C. A further simultaneous addition was then performed over the course of 7 minutes with a sodium silicate flow rate of 577 L/h (same sodium silicate as in the first simultaneous addition) and a flow rate of sulfuric acid (concentration: 7.7 wt %) regulated so as to maintain the pH of the reaction medium at a value of 8.0.

After this simultaneous addition, the pH of the reaction medium was brought to a value of 4.8 by introduction of sulfuric acid (concentration: 7.7 wt %) to obtain a suspension of precipitated silica. The suspension was filtered and washed on a filter press, to give a precipitated silica cake with a solids content of 20.7 wt %. The silica cake obtained was then subjected to a liquefaction step in a continuous vigorously stirred reactor with addition of 1360 grams of a sulfuric acid solution (conc.: 7.7 wt %). The resulting slurry was dried by means of a nozzle spray dryer to obtain precipitated silica S1. The properties precipitated silica S1 are reported in Table 1.

Example 2

927 liters of industrial water were introduced into a 2500 liter reactor and heated to 90° C. 14.7 kg of solid sodium sulfate were introduced into the reactor under stirring followed by the addition of sulfuric acid (concentration: 96 wt %) until the pH reached the value of 4.1.

A sodium silicate solution (SiO$_2$/Na$_2$O weight ratio: 3.43, density: 1.230 kg/L) was introduced into the reactor over a period of 50 minutes, at a flow rate of 352 L/h, simultaneously with sulfuric acid (concentration: 7.7 wt %). The flow rate of the acid was regulated so as to maintain the pH of the reaction medium at a value of 4.1. The amount of silicate added to the reaction medium was 78% of the total amount.

After 50 minutes the introduction of acid was stopped and the addition of silicate was continued until the pH reached a value of 8.0. Meanwhile the temperature was increased to 94° C. A further simultaneous addition was then performed over the course of 7 minutes with a sodium silicate flow rate of 577 L/h (same sodium silicate as in the first simultaneous addition) and a flow rate of sulfuric acid (concentration: 7.7 wt %) regulated so as to maintain the pH of the reaction medium at a value of 8.0.

After this second simultaneous addition, the reaction medium was brought to a pH of 4.7 by introduction of sulfuric acid (concentration: 7.7 wt %) and a suspension of precipitated silica was obtained. The suspension was filtered and washed on a filter press, to give a precipitated silica cake with a solids content of 19.5 wt %. Silica cake obtained was then subjected to a liquefaction step in a continuous vigorously stirred reactor with addition to the cake of 1751 grams of a sodium aluminate solution with an Al$_2$O$_3$ content of 22.5 wt %. The resulting slurry was dried by means of a nozzle spray dryer to obtain precipitated silica S2. The properties precipitated silica S2 are reported in Table 1.

Comparative Example 1

960 liters of water were introduced into a 2500 liter reactor and heated to 90° C. 15 kg of solid sodium sulfate were introduced into the reactor under stirring. Sulfuric acid (concentration: 96 wt %) was then added until the pH reached the value of 3.7.

A sodium silicate solution (SiO$_2$/Na$_2$O weight ratio: 3.41, density: 1.231 kg/L) was introduced into the reactor over a period of 25 minutes, at a flow rate of 370 L/h, simultaneously with sulfuric acid (concentration: 7.7 wt %). The flow rate of the acid was regulated so as to maintain the pH of the reaction medium at a value of 3.7. The amount of silicate added to the reaction medium was less than 50% of the total amount of silicate required for the reaction.

After 25 minutes of simultaneous addition at 90° C., the introduction of acid was stopped and the pH of the reaction medium allowed to reach 8.0. Meanwhile the temperature was increased to 94° C. A further simultaneous addition was then performed over the course of 18 minutes with a sodium silicate flow rate of 600 L/h (same sodium silicate as for the first simultaneous addition) and a flow rate of sulfuric acid (concentration: 7.7 wt %) regulated so as to maintain the pH of the reaction medium at a value of 8.0.

After this simultaneous addition, the reaction medium was brought to a pH of 4.5 by introduction of sulfuric acid (concentration: 7.7 wt %) and a suspension of precipitated silica was obtained. The suspension was filtered and washed on a filter press, to give a precipitated silica cake with a solids content of 19.2 wt %. The silica cake was subjected to a liquefaction step in a continuous vigorously stirred reactor with simultaneous addition to the cake of sulfuric acid (concentration: 7.7 wt %) and of a sodium aluminate solution (Al/SiO$_2$ ratio: 0.30 wt %).

The liquefied cake was subsequently spray dried using a nozzle atomizer to provide silica CS1. The properties of silica CS1 are reported in Table 1.

TABLE 1

| Silica | S$_{CTAB}$ (m$^2$/g) | S$_{BET}$ (m$^2$/g) | d50 (nm) | Ld | Al (ppm) | V$_{(d5-d50)}$/V$_{(d5-d100)}$ |
|---|---|---|---|---|---|---|
| S1 | 252 | 327 | 125 | 2.0 | 4000 | 0.75 |
| S2 | 268 | 317 | 123 | 1.9 | 3400 | 0.75 |
| CS1 | 258 | 280 | 97 | 1.4 | 3200 | 0.69 |

Examples 3-5—Comparative Example 2

The control composition CE2 comprises the silica CS1. The compositions E3 to E5 in accordance with the invention comprise silica S1 and S2.

Compositions were prepared according to the following recipes given in Table 2 (components are expressed in part by weight per 100 parts of elastomers (phr)).

TABLE 2

|  | CE2 | E3 | E4 | E5 |
|---|---|---|---|---|
| SBR (1) | 103.1 | 103.1 | 103.1 | 103.1 |
| BR (2) | 25.0 | 25.0 | 25.0 | 25.0 |
| Silica CS1 | 70.0 |  |  |  |
| Silica S1 |  | 70.0 |  | 80.0 |
| Silica S2 |  |  | 70.0 |  |
| Coupling agent (3) | 8.8 | 8.8 | 8.8 | 10.0 |
| Plasticizer (4) | 7.5 | 7.5 | 7.5 | 7.5 |
| Carbon black N234 | 3.0 | 3.0 | 3.0 | 3.0 |
| ZnO | 2.5 | 2.5 | 2.5 | 2.5 |
| Stearic acid | 2.0 | 2.0 | 2.0 | 2.0 |
| Antioxydant (5) | 2.5 | 2.5 | 2.5 | 2.5 |
| Sulfur | 1.4 | 1.4 | 1.4 | 1.4 |
| CBS (6) | 2.2 | 2.4 | 2.3 | 2.5 |
| DPG (7) | 2.4 | 2.8 | 2.7 | 3.1 |

(1) SSBR with 44.5% vinyl-1,2; 26% bound styrene; extended with 37.5 phr TDAE oil, Tg = −30° C. (« Buna VSL 4526-2 HM » from Arlanxeo);
(2) BR (« Buna CB 25 » from Arlanxeo)
(3) TESPD (« Luvomaxx TESPD » from Lehman & Voss)
(4) TDAE (Treated distillate aromatic extract) (« Vivatec 500 » from Hansen & Rosenthal KG)
(5) N-1,3-dimethylbutyl-N-phenyl-para-phenylenediamine (« Santoflex 6-PPD » from Flexsys)
(6) N-Cyclohexyl-2-benzothiazyl-sulfenamide (« Rhenogran CBS-80 » from RheinChemie)
(7) Diphenylguanidine (« Rheonogran DPG-80 » from RheinChemie)

Preparation of rubber compositions: The process for preparing the rubber compositions was conducted in three successive phases. First and second mixing stage (non-productive stages, NP1 and NP2) consists in a thermomechanical working at high temperature, followed by a third mechanical working stage (productive stage, P3) at temperatures below 110° C. The latter allows the introduction of the vulcanization system. The first and second phase were carried out by means of an internal mixer from Brabender (net chamber volume: 380 mL) with respectively a fill factor of 0.62 and 0.60. The initial temperature and the speed of the rotors were fixed each time so as to reach mixing drop temperatures of about 140-170° C. Duration of the first mixing stage was between 2 and 10 minutes. After cooling of the mixture (temperature below 100° C.), the second mixing phase allows the introduction of the vulcanization system (sulfur and accelerators). It was carried out on an open two roll mill, preheated to 50° C. The duration of this phase was between 2 and 6 minutes. The final rubber composition was then calendered in sheets at 2-3 mm thickness. An evaluation of rheological properties on the uncured compounds was first run to monitor processability indicators. Once the vulcanization characteristics were determined, uncured compounds were vulcanized at the vulcanization optimum (t98) and mechanical and dynamic properties were measured.

Viscosity of Uncured Compositions

Mooney viscosity was measured at 100° C. using a MV 2000 rheometer according to NF ISO289 standard. After one minute preheating, the value of the torque was read at 4 minutes (ML (1+4)–100° C.). Complementary, a strain sweep measurement from 0.9 to 50% was carried out using a D-MDR 3000 rheometer according to DIN 53529 standard, at a temperature of 100° C. and a frequency of 1 Hz. The results obtained with those two methods are shown in Table 3.

TABLE 3

|  | CE2 | E3 | E4 | E5 |
|---|---|---|---|---|
| ΔG' (0.9-50%) – 100° C. (kPa) – NP1 | 2756 | 1993 | 2729 | 3531 |
| ΔG' (0.9-50%) – 100° C. (kPa) – NP2 | 1181 | 746 | 1245 | 1632 |
| ML (1 + 4) – 100° C. (M.U) – P3 | 106 | 97 | 112 | 116 |

As can be seen in Table 3, the uncured compositions in accordance with the invention show lower (improved) Payne effect ΔG' (0.9-50%) and lower (improved) Mooney viscosity ML (1+4) at comparable CTAB values with respect to silica CS1 from control CE2. The uncured composition E4, because of the higher CTAB surface area of silica S2, has a slightly higher Mooney viscosity value but comparable Payne effect values ΔG' (0.9-50%) reflecting comparable processability of the uncured compound. It can be concluded that the processability of the non-vulcanized rubber mixtures containing the silica of the present invention is comparable to that shown by compositions containing high surface area silica from the prior art, having equal CTAB surface area.

Mechanical Properties of Cured Compositions

Shore A hardness measurement of the cured compositions (Vulcanization time t98 at 170° C.) were performed according to ASTM D 2240 standard. The values were measured after 3 seconds.

The uniaxial tensile tests were performed in accordance with the NF ISO 37 standard with H2 specimens at a speed of 500 mm/min on an INSTRON 5564. Moduli M100 and M300 (respectively obtained at strains 100% and 300%) and tensile strength are expressed in MPa; elongation at break is expressed in %. A reinforcement index (RI) defined as the ratio between modulus obtained at 300% strain and the one obtained at 100% strain was calculated. The measured properties are summarized in Table 4.

TABLE 4

|  | CE2 | E3 | E4 | E5 |
|---|---|---|---|---|
| Hardness Shore A-3s (pts) | 64 | 59 | 61 | 63 |
| Modulus M100 (Mpa) | 2.1 | 2.3 | 2.4 | 2.6 |
| Modulus M300 (Mpa) | 8.3 | 9.5 | 9.4 | 10.7 |
| RI = M300/M100 | 3.9 | 4.1 | 4.0 | 4.2 |

The results in Table 4 show that the use of silica 51 and S2 at same loading as silica CS1, provides compounds with lower Shore A hardness, higher moduli M300 and higher reinforcement index RI than composition CE2.

Increasing the loading of 51 (Composition E5) to reach same Shore A hardness as composition CE2, leads to the same conclusions regarding improved reinforcement potential of the inventive silica.

Dynamic Properties of Cured Compositions

Dynamic properties were measured on a viscoanalyzer (Metravib DMA+1000) according to ASTM D5992.

Dynamic Response of Cured Compounds Under Strain Sweep Conditions

Parallelepiped specimens (section 8 mm$^2$ and height 7 mm) were subjected to a sinusoidal deformation in alternating double shear at a temperature of 40° C. and at a frequency of 10 Hz according to a cycle round trip, ranging from 0.1% to 50% for the forward cycle and from 50% to 0.1% for the return cycle. The values of the maximum loss factor (tan δ max), the shear storage modulus (G'0.1%, G*12%) and the Payne effect (G'0.1%-G'50%) were recorded during the return cycle. The results are shown in Table 5.

TABLE 5

|  | CE2 | E3 | E4 | E5 |
|---|---|---|---|---|
| G'0.1% (MPa) | 3.7 | 2.6 | 2.9 | 3.2 |
| G'0.1% – G'50% (MPa) | 2.6 | 1.5 | 1.8 | 2.0 |
| G*12% (MPa) | 1.5 | 1.5 | 1.6 | 1.6 |
| tan δ max | 0.245 | 0.190 | 0.203 | 0.218 |

The compositions in accordance with the invention E3 and E4 show drastically improved hysteresis properties at high temperature (40° C.) based on lower values of tan δ max and Payne effect ($G'_{0.1\%}$-$G'_{50\%}$) compared to composition CE2. In spite of the higher silica S1 loading in composition E5, the tan δ max value is kept substantially lower than state of the art composition CE2. Those indicators attest that compositions E3 to E5 to have excellent potential in tire tread compositions in particular in improving rolling resistance without deteriorating handling (steering) performance of the tire (G*12%).

Dynamic Response of Cured Compounds Under Temperature Sweep Conditions

The dynamic response of the vulcanized rubber compositions is measured by soliciting parallelepiped specimens (section 8 mm$^2$ and height 7 mm) at a temperature sweep from −45° C. to +45° C. (temperature rise rate of +5° C./min), under an alternating double shear sinusoidal deformation of 1% and at a frequency of 10 Hz. The maximum loss factor (tan δ max) is then monitored. The results are summarized in Table 6:

TABLE 6

|  | CE2 | E3 | E4 | E5 |
|---|---|---|---|---|
| tan δ max | 0.720 | 0.862 | 0.832 | 0.832 |
| T max (° C.) | −26 | −27 | −27 | −26 |

The compositions in accordance with the invention E3 and E4 show drastically improved hysteresis properties at low temperature, by increasing substantially the maximum loss factor (tan δ max) compared to composition CE2. In spite of the higher silica S1 loading in composition E5, the tan δ max value is improved over the state of the art composition CE2.

The examination of above described properties demonstrates that the compositions containing inventive silicas S1 and S2 have an excellent potential in tire tread compositions in particular in improving substantially rolling resistance and wet grip at comparable level of tire handling and without deteriorating wear performance and processability behavior performances.

The invention claimed is:

1. A process for the preparation of a precipitated silica comprising:
- a CTAB surface area SCTAB equal to or greater than 160 m²/g,
- a median particle size d50, measured by centrifugal sedimentation, such that $|d50|>25000/|S_{CTAB}|$ (I), wherein $|d50|$ represents the numerical value of the median particle size d50 measured by centrifugal sedimentation and expressed in nm and $|S_{CTAB}|$ represents the numerical value of the CTAB surface area SCTAB expressed in m²/g, and
- an aluminum content not exceeding 4500 ppm, said process comprising:
- (i) providing a starting solution having a pH from 2.0 to 5.0
- (ii) simultaneously adding a silicate and an acid to said starting solution such that the pH of the reaction medium is maintained in the range from 2.0 to 5.0,
- (iii) stopping the addition of the acid and of the silicate and adding a base to the reaction medium to raise the pH of said reaction medium to a value from 7.0 to 10.0,
- (iv) simultaneously adding to the reaction medium a silicate and an acid, such that the pH of the reaction medium is maintained in the range from 7.0 to 10.0, and
- (v) stopping the addition of the silicate while continuing the addition of the acid to the reaction medium to reach a pH of the reaction medium of less than 5.5 and obtaining a suspension of precipitated silica, wherein the amount of silicate added to the reaction medium during step (ii) is more than 55% of the total amount of silicate required for the reaction.

2. The process according to claim 1 wherein in step (iii) the addition of the acid is stopped while continuing the addition of the silicate to the reaction medium to raise the pH of said reaction medium to a value in the range from 7.00 to 10.00.

* * * * *